| United States Patent [19] | [11] Patent Number: 4,714,265 |
| --- | --- |
| Franklin | [45] Date of Patent: Dec. 22, 1987 |

[54] AUTOMATICALLY ALIGNED TOW BAR HITCH

[76] Inventor: John N. Franklin, 9 Fairway Ave., Iola, Kans. 66749

[21] Appl. No.: 35,177

[22] Filed: Apr. 7, 1987

[51] Int. Cl.⁴ .............................................. B60D 1/14
[52] U.S. Cl. ................................. 280/491 D; 280/482; 280/491 F
[58] Field of Search ............... 280/477, 478 R, 478 A, 280/478 B, 491 R, 491 A, 491 C, 491 D, 491 F, 482

[56] References Cited

U.S. PATENT DOCUMENTS

| | | | |
| --- | --- | --- | --- |
| 2,417,871 | 3/1947 | Heuerman | 280/482 |
| 3,105,706 | 10/1963 | Adam | 280/491 D |
| 3,147,027 | 9/1964 | Bronleewe | 280/491 D |
| 3,281,163 | 10/1966 | Wiebe | 280/491 D |
| 3,326,573 | 6/1967 | Neitzey, Jr. | 280/482 |
| 3,774,949 | 11/1973 | Eger | 280/491 D |
| 4,022,489 | 5/1977 | Shattles et al. | 280/491 E |
| 4,552,375 | 11/1985 | Kinzenbaw | 280/491 D X |
| 4,577,883 | 3/1986 | Duncan | 280/491 D |

*Primary Examiner*—John J. Love
*Assistant Examiner*—Charles R. Watts
*Attorney, Agent, or Firm*—Dowell & Dowell

[57] ABSTRACT

A tow bar assembly for use with automotive vehicles for enabling one vehicle to be towed by another and wherein the hitch bar is laterally and pivotably adjustable by being attached to a self-centering sleeve which is slideably disposed about a cross bar that is secured to the front end of the trailing vehicle. The tow bar assembly allows the hitch carried by the hitch bar to be raised and urged forwardly and laterally so that the hitch may be engaged with the hitch ball of the towing vehicle without having to have the vehicles in perfect alignment. Minor movement of the trailing vehicle will thereafter automatically cause the centering sleeve to slideably traverse the cross bar thereby allowing the receiver hitch bar to become automatically centered and locked into proper towing position.

16 Claims, 10 Drawing Figures

AUTOMATICALLY ALIGNED TOW BAR HITCH

BACKGROUND OF THE INVENTION

1. Field of the Invention

This invention is generally directed to tow bar assemblies for use in towing or trailering one automotive vehicle behind another and more specifically to a tow bar hitch assembly which may be normally mounted in a stored position on the front end of a trailing vehicle and yet be extended for connection to the towing or pulling vehicle. The present invention makes it possible for one person to connect the tow bar assembly between the towing and trailing vehicle without requiring the exact positioning of the vehicles relative to one another. After being connected between the two vehicles, the tow bar assembly is designed to self-center itself and the component parts thereof will automatically lock with one another in a rigid configuration for towing by slightly maneuvering the trailing or towed vehicle.

2. History of the Art

At one time or another, many people have dealt with the frustrations and hazards of utilizing conventional types and styles of tow bar hitch equipment used for connecting trailers or other vehicles to a car, truck, moving van, camper or larger recreational vehicle. When trailering relatively small boat type or equipment hauling trailers, the tow bar hitch assembly is normally fixed to the trailing or towed vehicle and conventionally takes the form of a longitudinally extending trailer tongue that is reinforced by side brace members or chains which extend outwardly to the side frame of the trailing vehicle. The towing vehicle is generally provided with a reinforced fixed hitch ball mounted thereon which is adapted to be encircled or covered by the hitch component of the tow bar assembly of the trailing vehicle with appropriate spring-loaded wedges or pins being utilized to insure a locked engagement between the ball and the trailer hitch.

In most conventional tow bar hitches, whenever it becomes necessary to align the hitch of a tow bar assembly with the ball of the towing vehicle, the entire tow bar assembly must be properly aligned with the ball so that the hitch will be properly seated therewith prior to any locking mechanisms being urged into engagement to bind the hitch with the ball element. With many prior art structures, the hitch bar or trailer tongue is fixedly mounted with respect to the tow bar assembly with the result that the entire trailing vehicle must be maneuvered simultaneously with the tow bar assembly in order to align the hitch with the ball of the towing vehicle. Even with relatively small trailers, this alignment task can present may problems and undue safety hazards. If the trailing equipment is somewhat heavy, once the equipment has begun to move, it takes a great deal of physical effort to stop such movement to assure proper alignment of the tow bar hitch with the towing vehicle. Safety risks are frequently encountered by persons who rent small trailers for use in moving personal household goods and the like on a self-help basis. Oftentimes, the weight distribution of the goods within such trailers is such as to either cause the hitch bar or tongue of the trailer to be urged upwardly or downwardly with a great deal of force about the trailer's axle. Such forces or movement must be resisted by someone trying to maneuver the trailer and such physical resistance may result in personal injury.

Other types of tow bar equipment are used in different environments where the danger of injury is lessened in that the trailing vehicle is stabilized and therefore not subject to sudden vertical movement. Such environments include the use of tow bar equipment in pulling or trailering a second vehicle such as is common practice where one person must move two vehicles between two locations or when one person wishes to tow a second vehicle behind a primary vehicle so that the secondary vehicle may be selectively used when the primary vehicle is parked in an appropriate area. In the camper and recreational vehicle industry, it is becoming more commonplace for camper and RV owners to trailer smaller family cars or jeeps and the like behind the recreational vehicle so that the smaller vehicles can be utilized when the larger vehicles are parked. This permits the recreational vehicle or camper owner to have vehicle access to areas which may be difficult to maneuver in with the larger RV or camper vehicles.

Many of the conventional tow bar structures utilized for towing one motor vehicle behind another are in the form of A-frames or T-shaped frames having a tongue or hitch bar that is fixedly oriented forwardly of the trailing vehicle. As with other prior art fixed frame tow bar devices, such structures required that the trailing vehicle be constantly manipulated forwardly, backwardly and transversely with respect to the towing vehicle in order to properly and accurately align the hitch carried by the tow bar over the receiving ball of the towing vehicle. Such an arrangement makes it practically impossible for the operator or a single person of a trailing vehicle to accurately align the hitch without receiving guidance from someone standing by to signal the operator as to the proper maneuvering of the trailing vehicle to assure proper alignment of the hitch. Due to these frustrations which are inherent in many automotive tow bar and hitch assemblies, new designs for tow bar assemblies have been proposed in an effort to increase the ease of alignment of the tow bar hitch equipment with the towing vehicle.

An early model of adjustable vehicle tow bar is disclosed in U.S. Pat. No. 2,417,871 to Heuerman. Tow bars of the type disclosed in Heuerman were originally designed to provide a straight line connection between the rear axle or a frame component of the towing vehicle and the front axle of the trailing vehicle. In Heuerman, however, such a connection was made using a pair of tubular members which were telescopingly associated with one another thereby permitting the length of the tow bar to be adjusted so as to accurately reflect the distance between the portion of the towing vehicle to which the tow bar was to be attached and the front axle of the trailing vehicle to which the tow bar was also to be attached. Locking devices were also provided to insure that the tow bar retained its adjusted position after installation. Such in-line tow bars have the distinct disadvantage of necessitating that a person utilizing the equipment access the undercarriage of both the towing and trailing vehicles in order to install the tow bar therebetween. Such an arrangement is not satisfactory for use by today's consumers. In addition, such equipment is not readily stored and therefore an extra carrying space would have to be provided for the tow bar when not in use.

In U.S. Pat. No. 3,105,706 to Adam, an adjustable tow bar hitch is disclosed which incorporates a generally T-shaped structure having an elongated trailer tongue which is pivotally mounted to the main or cross bar frame of the tow bar so as to be both slideable and pivotable with respect thereto. With such a structure, the trailer tongue may be slidingly positioned to one side of the cross bar frame and thereafter pivoted into generally parallel relationship thereto. Such an arrangement allows the tow bar to be collapsed into a compact configuration when not in use, however, the tow bar still requires that the trailing vehicle be properly aligned with the towing vehicle in order to permit the hitch portion of the tow bar to be properly aligned for coupling or seating to the connector portion or hitch ball of the towing vehicle. In use of this type of tow bar equipment, the tow bar tongue or hitch bar is initially slidingly positioned generally centrally of the cross bar frame which is attached to the trailing vehicle and thereafter the tongue pivoted into generally perpendicular relationship thereto. Although arcuate movement of the tongue is possible to align the hitch, it is necessary that the trailing vehicle be aligned so that the arcuate movement of the hitch of the tongue passes over the proper point at which the engagement between the hitch and the towing vehicle is to be made.

A more recent modification to prior art tow bar assemblies is disclosed in U.S. Pat. No. 4,577,883 to Duncan. This type of tow bar equipment is designed not only to permit the tow bar to be collapsed and stored along the front bumper of the towed or trailing vehicle when not in use but also is designed to facilitate the coupling of the hitch portion of the tow bar to the towing vehicle. The tow bar includes a main frame which is mounted to the front end of the trailing vehicle and to which a slideable sleeve is mounted so as to be both rotatably and longitudinally moved relative thereto. This arrangement permits the pivoting of the tow bar reach or tongue to be shifted both horizontally and rotated vertically relative to the main tubular cross member of the assembly. In addition, the tow bar reach or tongue is pivotally mounted to the slideable sleeve so that the reach or tongue may be oriented in a variety of directions regardless of the positioning of the slideable sleeve with respect to the main tubular cross bar of the assembly. Chains are also provided extending from the edges of the mounting frame forwardly to the front end of the tongue or trailer bar reach with the chains being relatively slack when the reach is not fully extended toward the towing vehicle. This structure enables the reach or trailer tongue to be manipulated more freely relative to the towing vehicle. As the reach of the assembly is extended, the chain allows the reach to achieve a maximum extension and thereby determines the degree of flexibility and range of coupling which is possible with the tow bar apparatus. Although such an arrangement allows greater flexibility in the movement of the coupling and hitch components, such an assembly still requires that the hitch bar or tongue be positioned close enough to the trailer hitch ball of the towing vehicle so as to permit the hitch component to be mounted thereto. Therefore, the trailing vehicle is generally manipulated so that it is in alignment with the trailer hitch ball although the connection being possible within a range to either side of the trailer hitch ball due to the limited extension which is possible of the trailer tongue. Such an arrangement, however, requires that the adjustable sleeve of the tow bar be manually manipulated when adjusting the positioning of the tow bar tongue and further requires that the adjustable sleeve be positioned centrally of the support or cross bar frame and be in a locked position prior to taking any further efforts to align the trailer hitch with the trailer hitch ball of the towing vehicle.

Some additional examples of prior art tow bar equipment include U.S. Pat. No. 3,281,163 to Wiebe and U.S. Pat. No. 4,022,489 to Shattles et al.

SUMMARY OF THE INVENTION

The present invention is directed to an automatically aligning tow bar hitch which enables one person to effectuate the connection of a trailing vehicle to a towing vehicle in such a manner that the tow bar automatically aligns and locks itself into position by the movement of the trailing vehicle relative to the towing vehicle. The tow bar assembly includes a main frame or cross bar which is mounted to the bumper or front portion of the trailing vehicle on a pair of outwardly extending bracket members in such a manner that the cross bar is rotatable with respect thereto. A self-centering sleeve member is slideably carried over the cross bar and has outwardly extending flanges to which a hitch bar assembly is pivotally attached. The hitch bar assembly includes an outwardly extending housing or receiver tube in which a slideable hitch bar is cooperatively received so as to be extendable outwardly with respect thereto. A cable is secured at one end to the outwardly extendable hitch bar and extends rearwardly through the receiver tube and around a rotatable guide sleeve mounted between the flanges of the centering sleeve into a fixed engagement with the cross bar at a point which is remote from the sleeve. In this manner, as the hitch bar is urged outwardly of the receiver tube, the cable is pulled outwardly with respect thereto thereby causing the centering sleeve of the tow bar apparatus to be urged generally centrally of the cross bar toward the secured end of the cable. As the cross bar of the tow bar hitch is pivotable with respect to the mounting brackets, the hitch bar assembly may be raised and pulled forwardly with the hitch bar portion thereof being urged outwardly with respect to the trailing vehicle in such a fashion that the cable causes the centering guide sleeve to be automatically urged centrally of the main support frame. Therefore, the hitch bar assembly may be centered with respect to the cross bar by a backward and forward movement of the trailing vehicle after the hitch which is carried by the hitch bar assembly is engaged with the trailer hitch ball of the towing vehicle. A pair of bracket members are attached in pivotable relationship to the mounting brackets and on opposite sides thereof from the cross bar and provide a base for securing chain elements which extend from the brackets to the forward end portion of the receiver tube of the hitch bar assembly. The opposite ends of the mounting chains are mounted within spaced flanges which are welded or otherwise secured in angular relationship to the forward end of the receiver tube.

As the centering sleeve of the present apparatus is designed to be moved upon the extension of the hitch bar of the hitch bar assembly, appropriate locking pins are provided for securing the centering sleeve in its proper position when the hitch bar is fully extended. In order to accomplish the self-locking feature, the cross bar of the tow bar apparatus is provided with an opening therein into which a spring-loaded pin is directed upon reaching the center position of the tow bar. In a like manner and to insure that the apparatus is retained in a fully collapsed position when not in use, a separate opening is provided adjacent one end of the cross bar into which the locking pin will be selectively received when the tow bar assembly is not in use.

In order to insure that the tow bar apparatus of the present invention may be utilized by one person without such person having to physically make the locked engagement between the components of the tow bar apparatus, the locking pin assembly of the present invention which is carried by the slideable centering sleeve is spring-loaded so as to insure that the pin carried thereby is directed through the openings in the cross bar as the locking pin comes in alignment with such openings. An appropriate lever is provided with the locking pin assembly so as to urge the locking pin from engagement within the openings in the cross bar and thereby permit the automatic movement of the centering sleeve from a fully collapsed position to a centered position upon the extension of the hitch bar relative to the receiver tube.

In a similar manner, a spring-loaded locking pin is provided along the receiver tube of the hitch bar assembly and is disposed through an opening therein so as to align with an opening in the hitch bar so that the hitch bar may be locked in a fully closed position relative to the receiver tube. A conventional hitch is carried by the remote or outwardly extending end of the hitch bar and serves to engage the trailer hitch ball of the towing vehicle in a conventional manner.

It is a primary object of the present invention to provide a tow bar hitch for use for towing one vehicle behind another in which the tow bar allows the trailing vehicle to be connected to the towing vehicle by a single person without the aid of outside direction or without the individual having to make multiple attempts to effectuate the connection between the vehicles.

It is another object of the present invention to provide a tow bar apparatus for use in connecting a trailing vehicle to a towing vehicle wherein the hitch bar of the tow bar apparatus need not be locked into center position prior to the engagement of the hitch with the trailer hitch ball of the towing vehicle but wherein such true alignment may be effectuated after the connection therebetween has been made by the relative movement of the trailing vehicle with respect to the towing vehicle. In this manner, an individual may initially connect the tow bar apparatus between two vehicles and thereafter the apparatus will be automatically adjusted by movement of the trailing or towed vehicle into a properly locked position for towing without additional assistance or guidance being necessary.

A further object of the present invention is to provide a tow bar apparatus which is especially designed for use by recreational or camper type vehicles in towing a second vehicle wherein the tow bar apparatus is designed to be pivotally attached to the front end of the vehicle to be towed and is designed so that the component parts thereof may be readily folded upon one another into a compact overlapping assembly which may be locked relative to the bumper of the towed vehicle when the tow bar apparatus is not in use.

It is a further object of the present invention to provide a self-centering tow bar apparatus for use with in towing one vehicle relative to another where the component parts thereof may be locked into rigid relationship with respect to one another upon the movement of one of the vehicles relative to the other after such vehicles have been connected by joining the hitch of the tow bar apparatus to the trailer hitch ball of the towing vehicle.

BRIEF DESCRIPTION OF THE DRAWINGS

FIG. 5 is a partial cross sectional view taken along lines 5—5 of FIG. 1.

FIGS. 7–10 are respective illustrations showing the manner in which the hitch portion of the tow bar apparatus of the present invention may be initially engaged with a towing vehicle and thereafter the tow bar apparatus brought into an aligned and locked position automatically upon the movement of the trailing vehicle.

DESCRIPTION OF THE PREFERRED EMBODIMENT

With continued reference to the drawings, the tow bar hitch assembly 10 of the present invention is shown as being mounted to the front end of an automotive vehicle V1 which will be hereafter referred to as the trailing vehicle. The tow bar hitch assembly is utilized to connect the trailing vehicle V1 with a towing vehicle V2 which has a trailer hitch ball B welded or otherwise secured and extending from the rear end thereof.

Figure 2:
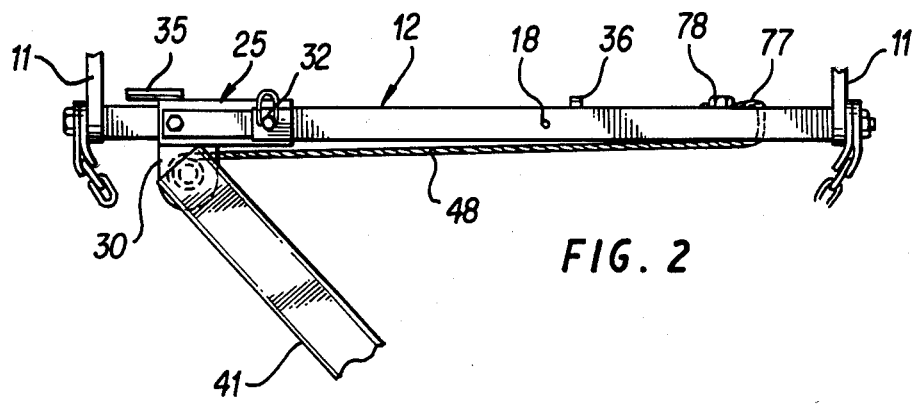
FIG. 2 is a partial top plan view of the tow bar apparatus of FIG. 1 showing the centering sleeve in a first storage position adjacent one of the tow bar mounting brackets.
Figure 3:
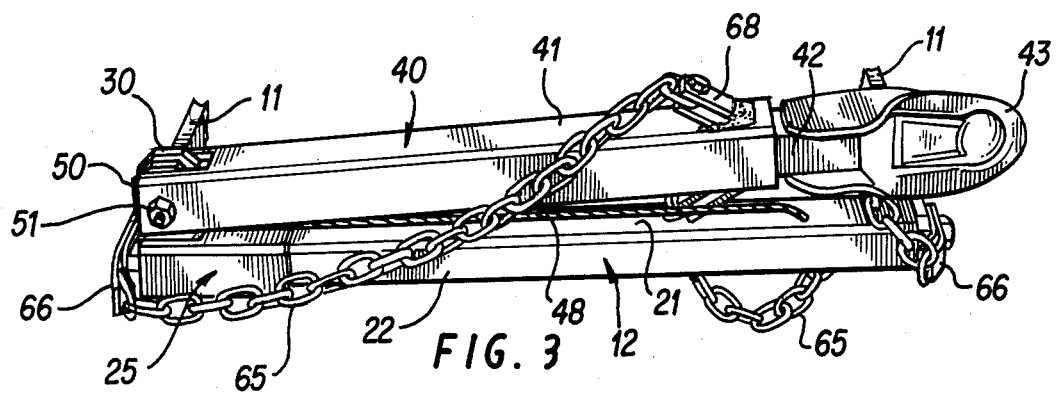
FIG. 3 is a view of the tow bar apparatus of the present invention showed in a collapsed and stored configuration.
Figure 4:
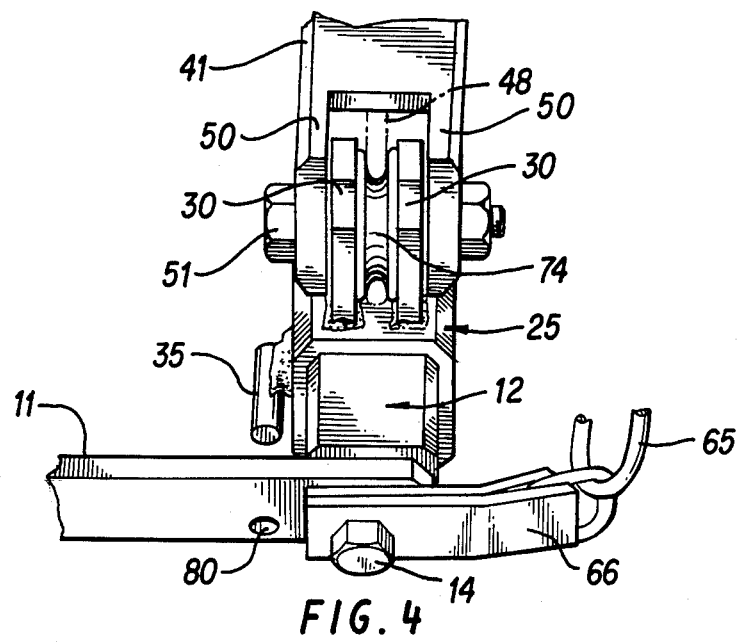
FIG. 4 is an enlaged partial right side view of the tow bar apparatus of FIG. 3.

The tow bar hitch assembly is mounted by way of a pair of outwardly extending mounting brackets 11 which are welded, bolted or otherwise secured to the frame of the trailing vehicle V1. As shown in FIG. 2 of the drawings, the mounting brackets 11 are oriented adjacent each side of the front of the vehicle and are generally equally spaced with respect to the sides of the vehicle. A cross bar 12 is mounted between each of the bracket members 11 utilizing pins 13 which extend outwardly from the ends of the cross bar through aligned openings in the outer portion of the bracket members. Each pin 13 includes a non-threaded shank portion which is oriented through the opening in the bracket members 11 and an outer threaded end portion which selectively receives a locking nut 14. In this manner, when the cross bar is mounted to the mounting brackets 11, the cross bar will be pivotable or rotatable within the openings thereby permitting the cross bar to be reoriented with respect to the bracket members. The cross bar is preferrably constructed of tubular metal stock material having a generally square or rectangular cross section. The ends of the cross bar are closed by welding end plates 15 therein through which openings are made which align with the openings in the outer portion of the mounting brackets 11. A first opening 16 is made through the upper wall 17 of the cross bar at a point spaced inwardly from one end thereof for purposes of which will be described in greater detail hereinafter. A second opening 18 is also made through the upper wall 17 of the cross bar at a point remotely spaced from the opening 16 for purposes which also will be described in greater detail hereinafter.

A pair of enlarged openings 19 are provided adjacent each of the end plates 15 of the cross bar and along the rear wall 20 for purposes of allowing the pin members 13 to be placed in outwardly extending relationship with respect to the ends of the cross bar and through the aligned openings in the mounting flanges 11. The cross bar also includes substantially closed and continuous front and bottom walls 21 and 22, respectively.

Prior to mounting the cross bar to the mounting flanges 11, a centering sleeve assembly 25 is placed in sliding engagement surrounding the cross bar. The centering sleeve assembly 25 includes a tubular body portion 26 which has a generally rectangular cross section and is of a size to be slidingly received over the cross bar. The body member includes an upper wall 27, front wall 28 and a rear wall 29. A pair of spaced flange elements 30 extend outwardly from the front wall 28 and are welded or otherwise secured thereto A generally L-shaped flange element 31 is welded or otherwise secured to the upper wall 27 of the centering sleeve and has an opening therein through which a spring-loaded locking pin 32 is selectively received. The spring-loaded locking pin cooperates with the spring element 33 which is also secured to the upper wall of the centering sleeve by suitable fasteners including a bolt 34. A generally cylindrical pin member 35 is welded adjacent the outer end of the centering sleeve and is welded thereto at the point of intersection between the top and rear walls and extends outwardly from the ends thereof for purposes of which will be described hereinafter in greater detail.

As previously discussed, the cross bar includes a first opening 16 which is disposed through the upper wall 17 thereof in spaced relationship to one of the end portions 15. The spacing of the opening 16 is such as to allow the locking pin 32 carried by the centering sleeve 25 to drop into locked engagement with the opening when the centering sleeve is moved into substantially flush alignment with the end portion 15 of the cross bar adjacent the opening 16. When the locking pin 32 is engaged within the opening 16, the centering sleeve will be in its non-use or storage position. By selectively elevating the spring-loaded locking pin 32, and raising the pin from its seated engagement within opening 16, the centering sleeve may be released and thereafter moved along the cross bar until such time as the spring-loaded pin 32 is aligned with the opening 18 therein. As the spring-loaded pin 32 comes into alignment with the opening 18, the pin will automatically descend into the opening thereby locking the centering sleeve in a second or centered position with respect to the cross bar. In this position, the flange elements 30 will be oriented along the center of the cross bar and extend outwardly perpendicular with respect thereto.

Figure 6:
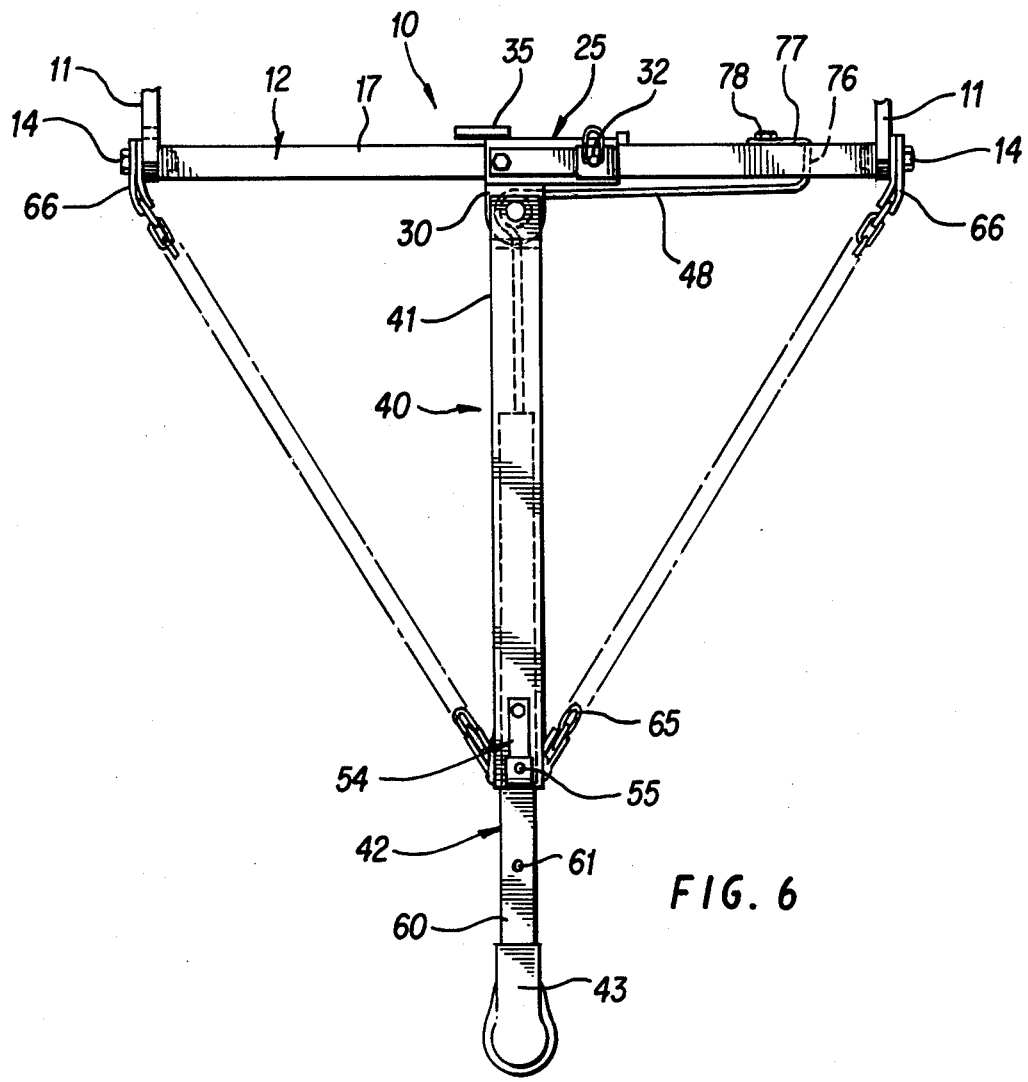
FIG. 6 is a top plan view of the tow bar apparatus of FIG. 1.

To insure that the locking pin 32 accurately aligns with the opening 18 as the centering sleeve is moved toward a center position with respect to the cross bar, a centering sleeve stop 36 is welded or otherwise secured to the back wall of the cross bar as shown in FIG. 6. The stop 36 is positioned to insure that the locking pin 32 will be in alignment with the opening 18 as the centering sleeve is moved into engagement with the stop element.

Pivotally mounted to the spaced flange elements 30 of the centering sleeve 25 is the hitch bar assembly 40 of the tow bar apparatus. The hitch bar assembly includes an outer receiver tube 41 which is generally hollow and rectangular in cross section and in which is slideably received the hitch bar 42. A conventional trailer hitch 43 is welded or otherwise secured to the outer end of the hitch bar 42. The hitch bar 42 is also generally rectilinear in cross section is of a size to be slidingly received in generally abutting relationship with the side walls of the receiver tube 41. The inner end portion 44 of the hitch bar 42 is sealed by an end wall member 45 which is welded in place. An opening 46 is made through the end wall 45 for purposes of allowing a centering cable 48 to be extended therethrough.

The receiver tube 41 includes a pair of horizontally oriented flange mounting portions 50 which are spaced so as to receive the mounting flanges 30 of the centering sleeve therebetween. Aligned openings are made through the flanges 50 and the flanges 30 through which a bolt or other securing means 51 is received to thereby pivotally connect the receiver tube 41 to the centering sleeve assembly 25. A plug member or wall 52 is welded within the end of the receiver tube 41 adjacent the flanges 50 to thereby close the interior thereof with respect to the flanges 30 of the centering sleeve. A cable guide opening 53 is made through the plug 52 through which the centering cable 48 is also extended. Mounted adjacent the outer end portion of the receiver housing is a second spring-loaded locking assembly 54 which includes a locking pin 55 and locking spring member 56 which is attached by suitable fastening means to the upper wall 57 of the receiver tube. The locking pin 55 is perpendicularly movable through an opening 58 adjacent the outermost end of the receiver tube so that the pin 55 is in general sliding engagement with the upper wall 60 of the hitch bar 42.

A locking pin receiving opening 61 is provided through the upper wall 60 of the hitch bar 42 at a point rearwardly of the hitch 43. The opening 61 is spaced so as to allow the locking pin 55 of locking assembly 54 to enter the opening 61 when the trailer hitch 43 is brought into abutting engagement with the wall 52 of the receiver tube thereby insuring that the hitch or hitch bar are prevented from being extended from the receiver tube without physical manipulation and releasing of the locking pin 55.

In order to further secure the hitch bar assembly with respect to the cross bar, a pair of diagonally oriented stabilizing chains 65 are secured adjacent the outer end of the receiver tube 41 and extend to mounting brackets 66 which are secured by the bolts 14 so as to be pivotable about the pins 13 which extend outwardly from either end of the cross bar. The forward ends of the stabilizing chains 65 are received within diagonally oriented spaced flange elements 68 which extend rearwardly and diagonally outwardly with respect to the end of the receiver tube 41. The chains may either be locked by pins extending through the opposing flanges 68 or may be welded or otherwise secured in place.

One of the primary benefits obtained by utilizing the structure of the present invention is that the tow bar apparatus may be installed by one person without having to leave their vehicle once the trailer hitch 43 is placed over the trailer hitch ball B of the towing vehicle V2. The self-centering and aligning features of the invention are made possible by utilizing the cable 48 which connects the hitch bar 42 to the cross bar 12 in such a manner that the cable is caused to automatically create a sliding movement of the centering sleeve assembly 25 as tension is applied to the cable 48 by the extension of the hitch bar 42. The outer end 70 of the cable is shown as being oriented within the hitch bar 42 and is retained therein by securing the end to opposing anchoring plates 71. The plate 71 will prevent the end of the cable from passing through the opening 46 in the rear wall 45 of the hitch bar. The cable extends rearwardly from the outer end through the opening 53 in the end wall 52 of the receiver tube and extends around a cable roller 74 which is rotatably mounted about the bolt 51 which connects the receiver tube to the flanges 30 of the centering sleeve assembly. Thereafter, the cable extends generally parallel to the front wall of the cross bar and through an opening 76 provided in the front wall and in spaced relationship from the end of the cross bar where the centering sleeve is in a stored position. The opening 76 is aligned with a corresponding opening in the rear wall of the cross bar with the inner end of the cable 77 being secured by a bolt and compression plate 78 to the rear wall of the cross bar as shown in FIG. 6. Because the ends of the centering cable are secured to the hitch bar and the cross bar with the intermediate portion of the cable extending around the cable roller which is carried by the centering sleeve, as the hitch bar is extended outwardly of the receiver tube, the centering sleeve will automatically be urged from its rest position adjacent one end of the cross bar to a locked and centered engagement relative to the cross bar wherein the locking pin 32 will align with the opening 18 to prevent further movement of the centering sleeve. Thereafter, a rearward movement of the hitch bar 42 relative to the receiver tube 41 will cause the locking pin 55 to engage in the opening 61 thereby securing the hitch 43 and the hitch bar 42 relative to the receiver tube.

Figure 1:
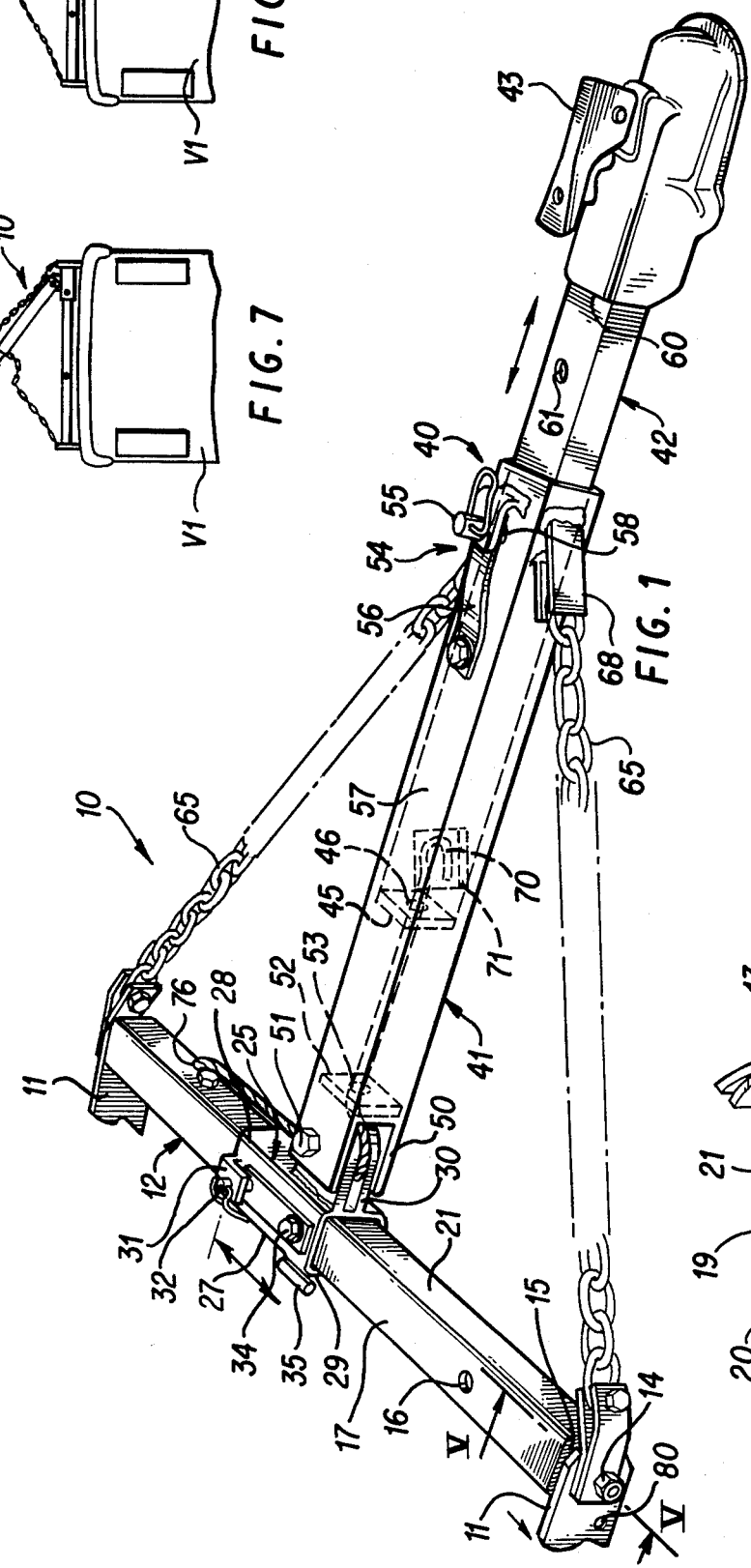
FIG. 1 is a perspective view of the tow bar apparatus of the present invention showing the receiver hitch bar in a centralized position with the hitch bar portion and hitch fully extended outwardly therefrom so as to be selectively engagable with a trailer hitch ball of a towing vehicle. The arrow in the drawing represents the limits of movement of the centering sleeve which is slideably oriented along the cross bar of the tow bar apparatus.

The tow bar apparatus of the present invention is also designed to be collapsed and pivoted into a compact storage arrangement when not in use. As previously discussed, the cross bar is pivotally mounted to the mounting brackets 11 so that it may be rotated with respect thereto. When it is desired to collapse the tow bar apparatus into a stored position, the locking pin 32 is raised from engagement with the opening 18 in the cross bar and with the pin 55 of the locking apparatus 54 being disposed within the opening 61 in the hitch bar, the centering sleeve 25 is moved to the left as shown in FIG. 1 until such time as the locking pin 32 comes almost into alignment with the opening 16. Thereafter, the hitch bar assembly 40 is pivoted about the flanges 30 of the centering sleeve and brought into generally parallel and abutting relationship with respect to the front wall of the cross bar. The stabilizing chains are of sufficient length to permit the hitch bar assembly to be brought into generally parallel engagement with the cross bar. Thereafter, the entire tow bar assembly is rotated upwardly with respect to the mounting brackets 11 thereby aligning the pin member 35 which is carried by the centering sleeve assembly to be aligned with an opening 80 made in the lower portion of the adjacent mounting bracket 11. The centering sleeve 25 is thereafter urged into closer engagement with the adjacent mounting bracket so that the pin member 35 extends through the opening so that the entire tow bar assembly is thereby prevented from rotating relatively to the mounting brackets. In this position, the locking pin 32 will engage in the opening 16 to further lock the components in a stored position. In the stored position, the chains and hitch bar assembly will be in overlying relationship with respect to the cross bar and thereby will not extend outwardly any greater distance from the vehicle V1.

The tow bar apparatus of the present invention is designed to provide ease of a trailering connection with a towing vehicle. In use, and with reference to FIGS. 7-10, respectively, when it is desired to connect the hitch 43 to the trailer ball B of a towing vehicle V2, the trailing vehicle V1 is brought into position in general alignment with the rear of the vehicle V2.

Due to the flexibility of the tow bar apparatus of the present invention, the towed vehicle may be positioned within 3-4 feet of the towing vehicle and may be to right of center with the trailer ball B by 6-8 inches or more (in cases where the centering sleeve is installed along the opposite end of the cross bar from that disclosed in the drawings, the trailing vehicle would approach to the left of center). The operator of the trailing vehicle thereafter disengages the locking pin member 32 allowing the centering sleeve to be moved slightly away from the end of the cross bar disengaging the locking pin 35 from the opening 80. The cross bar is thereafter rotated forwardly so that the hitch bar assembly 40 extends forwardly of the trailing vehicle. The hitch bar assembly is thereafter pivoted within the flange elements 30 of the centering sleeve so that the hitch 43 is aligned and positioned over the trailer ball B of the towing vehicle. Thereafter, the hitch is secured to the trailer ball in a conventional fashion. The components of the assembly are now in the configuration shown in FIG. 8.

Figure 9:
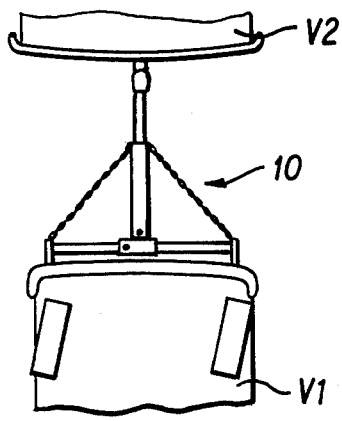
Figure 10:
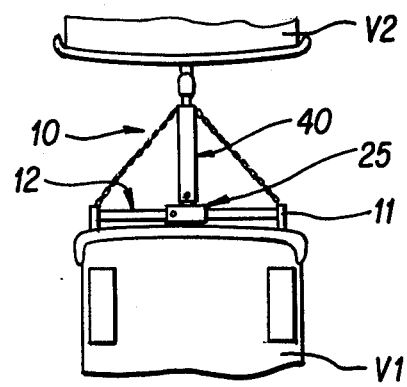

The operator of the vehicle has now done everything that is manually necessary in order to effectuate the coupling of the tow bar apparatus between the vehicles. The operator of the trailing vehicle hereinafter turns the wheels of the trailing vehicle slightly to the right as facing the rear of the towing vehicle and backs the trailing vehicle a small distance away from the towing vehicle. The position of the tow bar apparatus and vehicles will be as shown in FIG. 9. At this point, the operator of the trialing vehicle merely pulls forward until such time as the hitch bar is automatically locked to the receiver tube by the action of the spring-loaded locking pin 55. The vehicles are now in proper towing position with the tow bar apparatus fully locked and aligned as shown in FIG. 10 of the drawings.

I claim:

1. A tow bar apparatus which is mounted to a trailing vehicle for use in connecting the trailing vehicle to a towing vehicle and wherein the towing vehicle is provided with a point of connection extending from the rear end thereof, comprising a cross bar means having opposite ends and a central portion, bracket means for mounting said cross bar means to the trailing vehicle so as to be positioned generally forwardly with respect thereto, slide means movably supported with respect to said cross bar means between a first position adjacent one of said ends of said cross bar means and a second position generally along said central portion of said cross bar means, a hitch bar assembly having a first portion and a second portion slidably extended with respect to and generally axially of said first portion, pivot means for mounting said hitch bar assembly to said slided means, hitch means connected to said second portion of said hitch bar assembly, cable means having first and second end portions and an intermediate portion, means for connecting said first end portion of said cable means to said second portion of said hitch bar assembly, second means for securing said second end of said cable means to said cross bar means, and means for engaging said intermediate portion of said cable means with said slide means whereby as said second portion of said hitch bar assembly is urged outwardly with respect to said first portion thereof, said cable means will urge said slide means into said second position generally centrally of said cross bar means.

2. The tow bar apparatus of claim 1 including first locking means carried by the slide means, a first lock receiving means provided along said central portion of said cross bar means, said first locking means including a pin means which is engagable with said receiving means upon said slide means being positioned in said second position.

3. The tow bar apparatus of claim 2 including a second lock receiving means spaced adjacent said one of said ends of said cross bar means so as to be in spaced relationship with respect to said first lock receiving means, and means for positively urging said pin means into one of said first or second lock receiving means when said slide means is in said second or said first position, respectively.

4. The tow bar apparatus of claim 2 including a pair of spaced bracket means and means for pivotally connecting said opposite ends of said cross bar means to said spaced bracket means so that said cross bar means is rotatable with respect thereto.

5. The tow bar apparatus of claim 4 in which said slide means includes a main body portion having outwardly extending first flange means extending therefrom, said first portion of said hitch bar assembly having inner and outer ends, said inner end including a second flange means, said pivot means extending between said first flange means of said slide means and said second flange means of said inner end of said first portion of said hitch bar assembly and bearing means mounted adjacent said first and second flange means and being disposed about said pivot means, said intermediate portion of said cable means being engagable with said bearing means.

6. The tow bar apparatus of claim 5 including second locking means carried by said first portion of said hitch bar assembly adjacent said outer end thereof, a second lock receiving means disposed along said second portion of said hitch bar assembly, said second locking means including a pin means which is engagable with said second lock receiving means upon said second portion of said hitch bar assembly being urged inwardly with respect to said first portion thereof.

7. The tow bar apparatus of claim 6 including first and second stabilizer means extending from adjacent each of said opposite ends of said cross bar means to adjacent said second end of said first portion of said hitch bar assembly, first securing means for attaching said first and second stabilizer means relative to said cross bar means and second securing means for attaching said first and second stabilizer means to said first portion of said hitch bar assembly.

8. The tow bar apparatus of claim 7 in which said first securing means includes first and second stabilizer mounting brackets, means for pivotally mounting said first and second stabilizer mounting brackets to said pair of spaced bracket means, and means for connecting said stabilizer mounting bracket means to said stabilizer means.

9. The tow bar apparatus of claim 6 including extension pin means mounted to said slide means, said slide means having first and second end portions, said extension pin means extending outwardly with respect to said first end portion of said slide means and being oriented generally parallel with said slide means, one of said bracket means including means for receiving said extension pin means as said first end of said slide means comes into proximate relationship with respect thereto.

10. The tow bar apparatus of claim 9 including means for selectively locking said slide means relative to said cross bar means when said extension pin means is received by said one of said bracket means.

11. The tow bar apparatus of claim 10 in which said extension pin means is generally parallel with but normally out of axial alignment with said means for receiving said extension pin means but being selectively alignable therewith when said cross bar means is rotated with respect to said bracket means.

12. The tow bar apparatus of claim 11 including guide means secured within said first portion of said hitch bar assembly and adjacent said inner end thereof, said cable means extending through said guide means and toward said bearing means 13. A tow bar apparatus for use in connecting a trailing vehicle to a towing vehicle wherein the towing vehicle is provided with a point of connection extending from the rear end thereof, comprising a cross bar means having opposite ends and a central portion, a pair of spaced bracket means for mounting said cross bar means to the trailing vehicle so as to be positioned generally forwardly with respect thereto, means for pivotally mounting said cross bar means to said bracket means so that said cross bar means is rotatable with respect thereto, sleeve means slideably supported over said cross bar means and being movable between a first position adjacent one of said ends of said cross bar means and a second position generally along said central portion of said cross bar means, a first locking means carried by said sleeve means, said cross bar means having first and second lock receiving means for receiving said first locking means when said sleeve means is in said first and second positions respectively, a hitch bar assembly having a first portion and a second portion slideably extendable with respect to said first portion, pivot means for mounting said first portion of said hitch bar assembly to said sleeve means, bearing means carried by said pivot means, second locking means carried by said first portion of said hitch bar assembly, a lock receiving means disposed along said second portion of said hitch bar assembly to thereby engage said second locking means when said second portion of said hitch bar assembly is generally fully retained within said first portion thereof, cable means having first and second end portions and an intermediate portion, means for connecting said first end portion of said cable means relative to said second portion of said hitch bar assembly, second means for securing said second end of said cable means relative to said cross bar means, said intermediate portion of said cable means being extended around said bearing means carried by said pivot means so that said cable means is oriented away from said one end of said cross bar means toward said second end portion thereof whereby as said second portion of said hitch bar assembly is urged outwardly with respect to said first end portion thereof, said cable means will urge said sleeve means into said second position generally centrally of said cross bar means.

14. The tow bar apparatus of claim 13 in which said first and second locking means include first and second pin means respectively, said first and second pin means being positively urged toward engagement with said lock receiving means.

15. The tow bar apparatus of claim 14 in which said sleeve means includes first and second end portions, said first end portion of said sleeve means being oriented towards said one end of said cross bar means, and means carried by said sleeve means which extends outwardly from said first end portion thereof for engaging said bracket means adjacent to said one end of said cross bar means when said sleeve means is positioned in said first position relative to said cross bar means and after said cross bar means has been rotated relative to said bracket means.

16. The tow bar apparatus of claim 15 in which said cross bar means and said sleeve means are generally tubular in configuration and have generally rectangular cross sections.

* * * * *